(12) United States Patent
Lee

(10) Patent No.: US 9,189,608 B2
(45) Date of Patent: Nov. 17, 2015

(54) PERMISSION MANAGEMENT METHOD FOR APPLICATIONS, ELECTRONIC DEVICE THEREOF, AND COMPUTER READABLE MEDIUM

(71) Applicant: WISTRON CORP., New Taipei (TW)

(72) Inventor: Shi-Rui Lee, New Taipei (TW)

(73) Assignee: WISTRON CORP., New Taipei (TW)

( * ) Notice: Subject to any disclaimer, the term of this patent is extended or adjusted under 35 U.S.C. 154(b) by 189 days.

(21) Appl. No.: 13/756,587

(22) Filed: Feb. 1, 2013

(65) Prior Publication Data

US 2013/0347096 A1 Dec. 26, 2013

(30) Foreign Application Priority Data

Jun. 22, 2012 (TW) .............................. 101122412 A

(51) Int. Cl.
*H04L 29/00* (2006.01)
*G06F 21/30* (2013.01)
*G06F 21/62* (2013.01)

(52) U.S. Cl.
CPC ................ *G06F 21/30* (2013.01); *G06F 21/62* (2013.01); *G06F 21/629* (2013.01); *G06F 21/6218* (2013.01)

(58) Field of Classification Search
CPC .................................................... G06F 15/177
USPC ............................................ 707/803; 726/17
See application file for complete search history.

(56) References Cited

U.S. PATENT DOCUMENTS

| 7,127,580 B2 | 10/2006 | Takeuchi et al. |
| 7,921,287 B2 | 4/2011 | Sprigg et al. |
| 8,140,650 B2 | 3/2012 | Pulkkinen et al. |
| 8,386,533 B2 * | 2/2013 | Venkata Naga Ravi ...... 707/803 |
| 2006/0090202 A1 | 4/2006 | Liu et al. |
| 2012/0136904 A1 | 5/2012 | Kiran |

FOREIGN PATENT DOCUMENTS

| CN | 101091176 A | 12/2007 |
| TW | I227420 | 6/2005 |

(Continued)

OTHER PUBLICATIONS

Taiwan Patent Office, Office action issued on Apr. 21, 2014.
China Patent Office, Office action issued on Sep. 21, 2015.

*Primary Examiner* — Anthony Brown
*Assistant Examiner* — Michael D Anderson
(74) *Attorney, Agent, or Firm* — Li & Cai Intellectual Property (USA) Office

(57) ABSTRACT

A permission management method for an electronic device capable of installing at least one application is illustrated. The electronic device comprises a plurality of accessible operational functions. The method prepares a management table for recording corresponding operational functions that the application needs to access while performing the application, and a permission management program for controlling the management table. The permission management program may be performed to change the permission state of each operational function corresponding to the installed application. When the application installed in the device is performed and one of the operational functions is requested, the records in the management table are referred to determine whether the application is allowed to access the requested operational function.

16 Claims, 5 Drawing Sheets

(56) References Cited

FOREIGN PATENT DOCUMENTS

| TW | 200614767 A | 5/2006 |
|---|---|---|
| TW | 200634628 A | 10/2006 |
| WO | WO 2006070045 A1 * | 7/2006 |

* cited by examiner

FIG. 2A

| | WRITE_EXTERNAL_STORAGE | INTERNET | ACCESS_COARSE_LOCATION | READ_PHONE_STATE | ..... | WAKE_LOCK |
|---|---|---|---|---|---|---|
| UID1 | 1 | 1 | 1 | 0 | ..... | 0 |
| UID2 | 0 | 1 | 1 | 1 | ..... | 0 |
| ..... | | | | | | |
| UIDX | | | | | | |

FIG. 2B

| | WRITE_EXTERNAL_STORAGE | INTERNET | ACCESS_COARSE_LOCATION | READ_PHONE_STATE | ..... | WAKE_LOCK |
|---|---|---|---|---|---|---|
| UID1 | 0 | 1 | 1 | 0 | ..... | 0 |
| UID2 | 0 | 1 | 1 | 1 | ..... | 0 |
| ..... | | | | | | |
| UIDX | | | | | | |

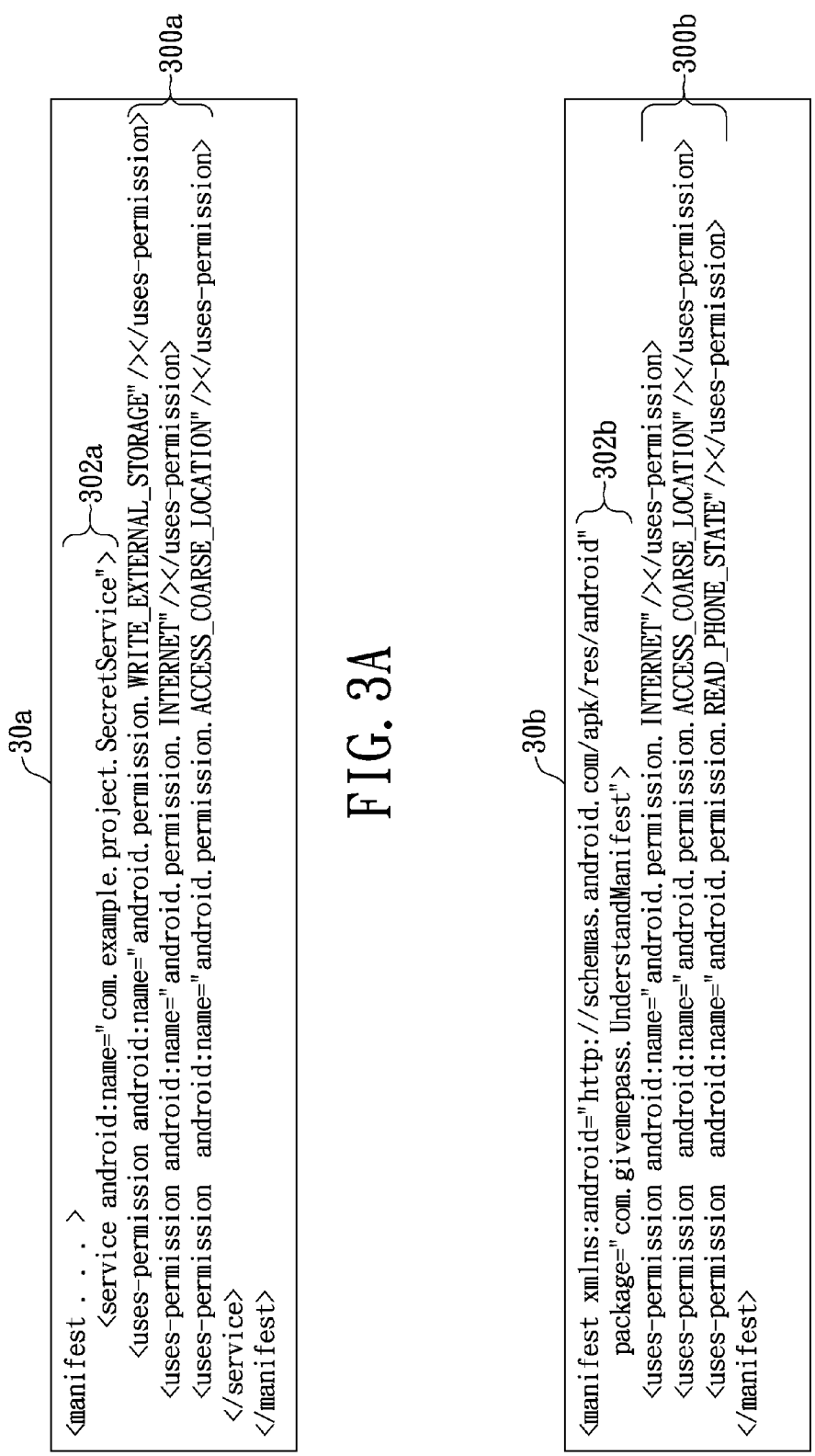

PERMISSION MANAGEMENT METHOD FOR APPLICATIONS, ELECTRONIC DEVICE THEREOF, AND COMPUTER READABLE MEDIUM

BACKGROUND OF THE INVENTION

1. Field of the Invention

The instant disclosure relates to a management method for applications and an electronic device thereof; in particular, to a permission management method for applications and an electronic device thereof.

2. Description of Related Art

Recently the popularization rate of the smart electronic device increases fast. Users can upload and download all kinds of applications via the Internet and install them in the electronic device for different service provision. Before different applications are installed in the electronic device, users will be reminded that there may be some system functional authority needed to be performed if they want to install applications in their electronic devices in order to perform authorized system functions for acquiring needed information or messages and further to provide the function or service of applications.

Among all kinds of system functions requested by the application, there may be partial functions the user doesn't want to make accessible; however, currently users can't by themselves decide whether or not to allow or reject when it comes to which function the application can access. Thus, if users install an application, and then they need to completely accept the authority the application requests or they can't do nothing but give up the installed application.

The present situation may cause that users can't adjust the operation of the application according to their needs when an application is operated in an electronic device, and that the information unrelated to the use of the application may be accessed with permission, which produces the risk of losing the security of user information.

SUMMARY OF THE INVENTION

The object of the instant disclosure is to offer a permission management method for applications, an electronic device thereof, and a computer readable medium.

In order to achieve the aforementioned objects, according to an embodiment of the instant disclosure, the permission method for applications comprises: providing a management table and a permission management program for managing the management table; when the application is installed in an electronic device, reading the authority access list and accessing the identification data recorded in the management table and at least one authority item, and each authority item corresponds to one of operational functions; filling up the identification data of the application into the management table according the authority access list and labeling the permission state of the operational function corresponding to the authority item in the management table as accessible for the application and labeling the permission states of other operational functions not corresponding to the authority item in the management table as inaccessible for the application; performing the permission management program after installing the application completely to change the permission state of the operational functions accessible for the application according to the authority item; and comparing records of the application in the management table associated with the application to determine whether or not to allow the application access the requested operation function when performing the application requesting.

In order to achieve the aforementioned objects, according to an embodiment of the instant disclosure, a computer readable medium is also provided for recording program codes. When the program codes are read by the processing unit, the processing unit will perform the program codes based on the method mentioned above.

Further, according to an embodiment of the instant disclosure, an electronic device that can manage the permission state of the application is provided, comprising a management table, a permission management program and a processing unit. The management table is for recording the identification data of at least one application installed in the electronic device and labeling the permission state of the operational function of the electronic device the application accesses. The permission management program is for accessing the management table and using it to change permission state of the corresponded operational function of the application in the management table; the processing unit is for performing the permission management program to manage the management table, wherein when the application is performed and requests to access one of the applications of the electronic device, the processing unit reads records in the management table associated with the application to determine whether or not to allow the application to access the requested operational function.

In order to further the understanding regarding the instant disclosure, the following embodiments are provided along with illustrations to facilitate the disclosure of the instant disclosure.

BRIEF DESCRIPTION OF THE DRAWINGS

FIG. 2A and FIG. 2B are schematic views of a management table according to an embodiment of the instant disclosure;

FIG. 3A and FIG. 3B are schematic views of a authority access list according to an embodiment of the instant disclosure;

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
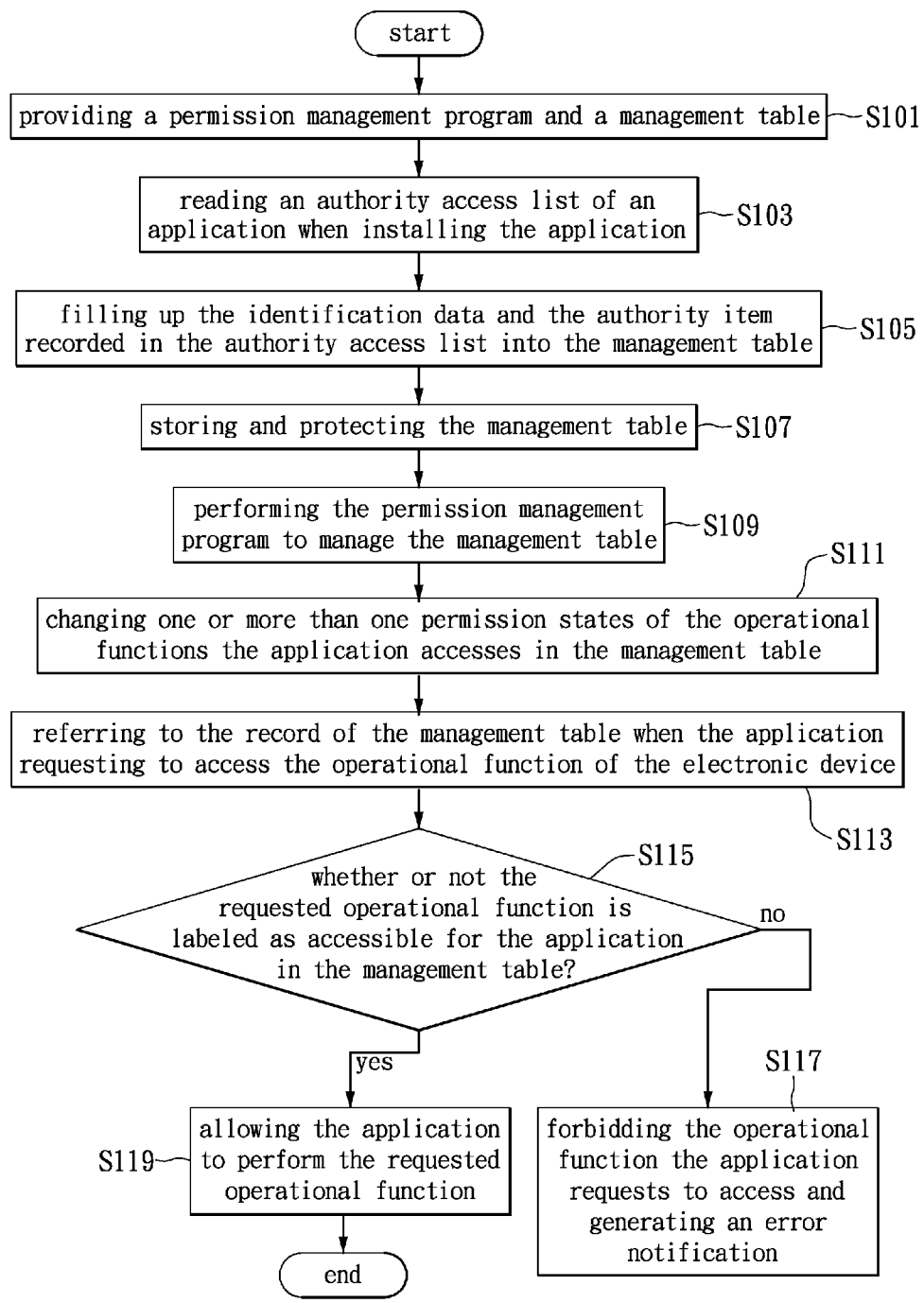
FIG. 1 shows a flow chart of a permission management method for applications according to an embodiment of the instant disclosure.

Please refer to FIG. 1. FIG. 1 is a flow chart of a permission management method for applications according to an embodiment of the instant disclosure. The method is for managing the permission state of the electronic system resources the application downloaded by the electronic device accesses.

The embodiment can first provide a management table and a permission management program for managing a management table (S101). The management table can be restored in an electronic device or a remote storage device as types of a code-protected document or data structure . . . etc. Please refer to FIG. 2A which is a schematic view of a management table according to an embodiment of the instant disclosure. In the management table 20, there're names of all the protected operational functions 200 of the electronic device for labeling the permission state of each operational function for each application. The operational function comprises, for example, sending (SEND_SMS), reading (READ_SMS), connecting the Internet (INTERNET), reading contact information (READ_CONTACTS), preventing the standby state of the electronic device (WAKW_LOCK), amending or deleting content of the random access memory (WRITE_EXTERNAL_STORAGE) or reading the geographical location of the electronic device (ACCESS_COARSE_LOCATION) . . . etc.

The permission state of one or more operational functions 200 may be needed for achieving functions or providing service when each application is performed in the electronic device. For example, a picture browsing application may need a permission of the electronic device to amend the content stored in the memory and to prevent the standby state of the electronic device. A messaging application may need permission of the electronic device about receiving, sending, editing, reading SMS or MMS and reading the identification of the electronic device . . . etc, for providing service via the electronic device. Thus, writers of each application can list the needed authority items for performing their applications in an authority access list to record one or more needed authority items of the applications. Please refer to FIG. 3A, which is a schematic view of an authority access list 30a according to an embodiment of the instant disclosure. Authority items 300a in the authority access list 30a are what the application requests to access when performed in the electronic device. There's also a unique identification data 302a of the application recorded in the authority access list 30a for distinguishing from other applications, such as the name of the application. The operational functions 200 (shown in FIG. 2A) of the electronic device in this embodiment comprise the authority items each authority access list may comprises.

A processing unit of the electronic device can read the authority access list of the application when installing the application (S103) and fill up the identification data and the authority items recorded in the authority access list into the management table (S105) for adding related records of the application into the authority access list. Also, please refer to FIGS. 2A and 3A. FIG. 3A shows the authority access list 30a of the first application. When the first application is installed in the electronic device, the processing unit reads the authority access list 30a first and writes the identification data 302a into a management table 20. The management table 20 adds recording columns according to the written identification data, and finds the corresponding operational function in the management table 20 according to the authority items 300a recorded in the authority access list 30a, and then labels the permission state of corresponding operational function as accessible for the first application and the permission state of not corresponding operational function as inaccessible for the first application. Also, FIG. 3B shows the authority access list 30b of the second application. When the second application is installed in the electronic device, the processing unit will deal with the authority access list 30b in the same way as mentioned, and adds records corresponding to the second application into the authority access list 20 shown in FIG. 2A.

For example, the authority items 300a in the authority access list 30a comprise amending/deleting content in the SD card (WRITE_EXTERNAL_STORAGE), Internet complete accessing (INTERNET) and accessing the coarse location (ACCESS_COARSE_LOCATION) . . . etc; the authority items 300b in the authority access list 30b comprise Internet complete accessing (INTERNET), accessing the coarse location (ACCESS_COARSE_LOCATION) and reading phone state and identification data (READ_PHONE_SATE) . . . etc. When the application having the authority access list 30a or 30b is installed in the electronic device, the identification data of the first and second applications will be filled up in the management table 20, respectively. (Column of the identification data 202 shown in FIG. 2A), and the operational function 200 corresponding to the authority item 300a and 300b will be labeled as accessible for the application in the column (as shown as "1" in the table 20 in FIG. 2A) and others are labeled as inaccessible for the application (as shown as "0" in the table 20 in FIG. 2A).

More precisely, even if the application is installed in the electronic device, if some operational function isn't recorded in the authority access list of the application as one of the authority items, the electronic device won't allow the application to call and perform the operational functions not recorded as authority items during the performing process. Accordingly, it's practical to label the permission state of all the operational functions for the application as inaccessible and then label the permission state of the operational functions corresponding to the authority items as accessible for the application in the column when the processing unit is reading authority items; however, there's no intention to limit this invention.

Please again refer to FIG. 1. After filling up the identification data of the application and authority items into the management table, the process unit can store the management table with codes as protection (S107) to make the data in the management table complete and safe. When the electronic device is downloading other applications, it can refer steps from S101 to S107, labeling the permission state of the operational function each installed application requests to access in the management table. Thus, the electronic device can collectively manage the operational functions that each application can access or can't access.

Further, if necessary, the processing unit can perform the permission management program to open the management table (S109) and change the permission state of each operational function for the application (S111). After that, the changed management table can again be stored with codes as protection.

For example, if the electronic device user doesn't want to allow the application access specific operational function of the electronic device, he can start the permission management program to read the files or data structure in the management table with the protecting codes. The permission management table can also show the management table via the user surface for the convenience of the user, such as a graphical user surface. The user can select one or more accessible operational functions for certain application and give an instruction to the processing unit to change the permission statement of the selected operational functions as inaccessible.

Therefore, it's convenient for an user to change the permission states of one or more operational functions for applications to set the needs of access of the operational functions for applications and further have some changes if necessary.

During the process of performing the application, the application may request for accessing specific operational function. For example, after starting the messaging application, the application will request for accessing the operational functions of reading, sending, editing message and directly dialing phone number for providing service to the user. When the processing unit receives the request, it can read the management table for acquiring related permission statement records (S113). The processing unit can compare the identification data of the application to check if the requested operational functions are accessible for the application (S115) because each application has a unique identification data such as an identification code or an UID. If the requested operational functions are inaccessible for the application, the processing unit won't allow the application access the requested operational functions and will send an error notification to notice the user (S117). This may happen when the requested operational functions are not the authority items in the authority access list of the application or when the permission state of the requested operational functions changed after step S111 as inaccessible. However, if the requested operational functions are accessible for the application, the processing unit will allow the application to access the requested operational functions by reading or writing some data.

What's worth mentioning is, only operational functions corresponding to the authority items can be labeled as accessible for the application so operational functions that can be changed labeling as inaccessible will also be corresponding to the authority items.

Besides, for the stability and security of the electronic device, the processing unit can merely change the permission state of the operational functions corresponding to the authority items, from accessible to inaccessible or from inaccessible to accessible, but not the permission state of the operational functions not corresponding to the authority items, for avoiding the unexpected risk resulted from the expanded authority access area.

Moreover, the permission management program can also be triggered by an event. The processing unit can start the permission management program if having notification of some predetermined events and change one or more permission states based on the information of the notification. For example, the Internet packets counter application with a threshold packet amount. When the packet amount reaches the threshold amount, the application will generate an even notification to the processing unit, and the processing unit further starts the permission management program and finds one or more related operational functions among the authority items.

From the above example, these event-related operational functions may comprise connecting the Internet and changing the state of net connection . . . etc. The processing unit can change the permission state of these operational functions from accessible to inaccessible to limit the application. For example, cutting the Internet connection to the application to make the amount of packet amount stop increasing and further becoming extra cost of the user. The processing unit can limit the access of one or more applications, or even all applications.

Further, for some specific result to limit the application, there may be more than one operational functions can't be accessed, which aren't likely be known by the user. Thus, the permission management program provides combination control options wherein each one comprises all related operational functions of an event. Because the authority access lists of all downloaded applications are stored in the file system of the electronic device, the user can select one combination control to generate an instruction turning permission state of all operational functions related to some event to have a specific result for one or more applications, or all applications. Further explanation comes as follow.

Figure 4:
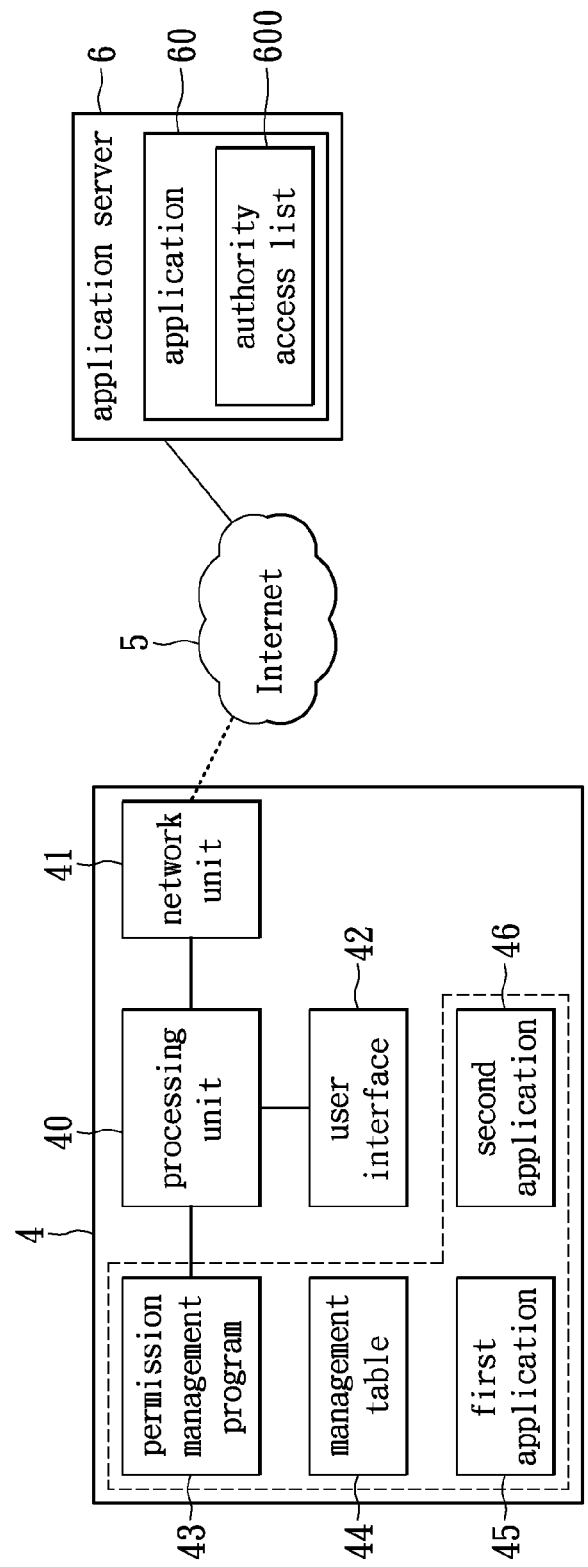
FIG. 4 shows a block diagram of an electronic device with capability of permission management for applications according to an embodiment of the instant disclosure.

Please refer to FIG. 4. FIG. 4 is a block diagram of an electronic device with capability of permission management for applications according to an embodiment of the instant disclosure. Also, there's a default option provided via the user surface for returning the initial setting according to the authority access lists of all downloaded applications. An electronic device 4 comprises a processing unit 40, a network unit 41, a user interface 42, a permission management program 43, a management table 44, a first application 45 and a second application 46. The electronic device 40 can download an application 60 from a remote application server 6 by connecting the Internet 5 with the network unit 41.

The electronic device 4 can be a smart phone, a flat PC, a PDA or other portable electronic operation devices that can install applications. Take a smart phone as an example in the following explanation. The processing unit 40 is the core of main operation of the electronic device 4 for starting and performing the file system and applications installed in the electronic device 4 to distribute and manage the system resources. The network unit 41 can be a wireless network module (Wi-Fi) or a third generation mobile technology (3G) letting the electronic device 4 connect to the Internet 5 for downloading or uploading data.

The permission management program 43 is built in the electronic device 4 for reading and writing the management table 44. When the electronic device 4 downloads the application 60, before installing, the user will be inquired whether or not to allow the application 60 to perform the operational functions corresponding authority items in the authority access list 600, according to the authority access list 600. When the processing unit 40 receives an allowing instruction (generally, installing agreement of the user is consider an allowing instruction), the permission management program will add columns into the management table 44 according to the authority access list 600 of the application 60 to record the operation functions that the user allow the application 60 to access.

Please to FIG. 2. The identification data of the application 60 can be added in the management table 44 such as the application name. "1" or "0" will be labeled in the columns of authority items for the application 60, "1" means accessible and "0" means inaccessible. Thus, the permission state of each operational function for every application about to be installed can be together managed in the management table 44 that can be a file document or a data structure stored in the electronic device 44.

Additionally, in this embodiment, the processing unit 40 can perform the permission management program 43 to change the management table 44 based on the needs of the user. The management table 44 can be shown in the user surface 42 in a graphical way for the convenience of the user. The permission management program 43 also can decode or provide a code to open the management table that maybe be coded and the processing unit 40 can change the permission state of the operational function for each application by the permission management program 43. The permission management program can read the management table 44 and provide a graphical menu 42a (as shown in FIG. 5) with options such as customize 420, combination control 422 and default 424, etc.

When the user selects the customize option 420, the permission management program 43 will further provide a graphical management table 20 as shown in FIG. 2 via the user surface 42. The user can determine to open or limit the operational functions for one or more applications by marking the columns and the permission management program then changes the management table 44 according to the marked columns. For example, please refer to FIGS. 2A and 2B, the user can change the permission state labeling of the operational function corresponding to the identification data of the first application 45 "Internet complete accessing (INTERNET)" from accessible labeling "1" to inaccessible labeling "0" in the management table 44. The accessible and inaccessible labels are not limited to "1" and "0", and can be others like "Y" and "N", which depend on the user preference.

Figure 6:
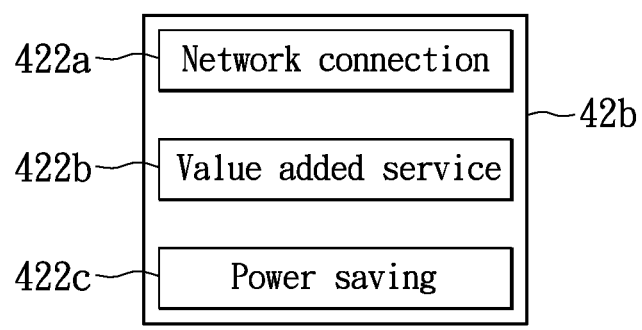
FIG. 6 shows a schematic view of another menu displayed by a user interface according to an embodiment of the instant disclosure.

Moreover, when the user selects the combination control option 422, the permission management program 43 will provide another management table 42b of a plurality of combination control options as shown in FIG. 6 via the user surface 42, such as Network Connection option 422a, Value Added Service option 422b and Power Saving option 422c, etc. The Network Connection option 422a relates to the operational functions about the Internet accessing ability, such as reading the network state, reading the Wi-Fi state and connecting Wi-Fi, etc. The Value Added Service option 422b may relate to the operational functions like automatic dialing or messaging. The Power Saving option 422c may relate to preventing the standby state of the electronic device and turning on the flasher, etc. When the user selects one of the combination control options, the permission management program can automatically limit the permission states of all the related operational functions for the application.

Figure 5:
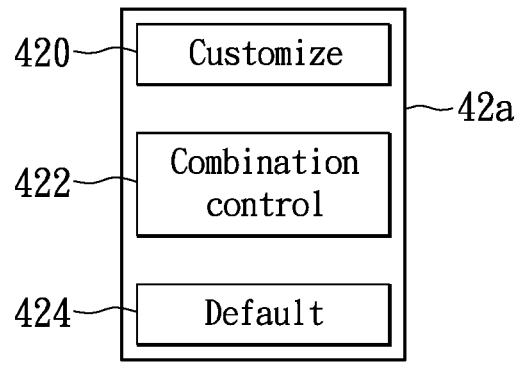
FIG. 5 shows a schematic view of a menu displayed by a user interface according to an embodiment of the instant disclosure.

The default option shown in FIG. 5 is provided for the user to return all the permission states of the operational functions for the application to the initial setting as recorded in the authority access list by reading the authority list (as shown in FIGS. 3A and 3B) which is stored in the file system of the electronic device 4 after the applications was installed, and comparing the identification data and corresponding operational functions of each application 45, 46 and labeling the permission states.

Particularly, for avoiding the unexpected operating risks and security problems resulted from the expanded authority area acquired by the application, when the user tends to change a permission state of an operational function for the application, the permission management program 43 can determine whether or not the operational function is originally accessible for the application according to the authority access list. If the answer is no, the permission management program 43 will forbid the change of the permission state of the operational function for the application in the management table 44. In other words, the permission management program 43 and the management table 44 in this embodiment can help limit the access of operational functions for the application and prevent the application from acquiring the expanded authority area.

Also, the access authority of the application can be automatically changed with an event trigger. The processing unit 40 can detect or supervise specific event by the installed application in the electronic device 4. For example, a battery count program can send an event notification to the processing unit 40. The processing unit 40 will start the permission management program 43 and then the permission state of operational functions for each application will be changed according the event notification, like making the operational function "turning the flasher on" inaccessible for the photographing application.

Please again refer to FIG. 4. The permission state of the operational function for the application is recorded in the management table 44 so when the applications 45, 46 are performed and they request to access certain operational function, the processing unit 40 can immediately read the management table 44 and check if the application is allowed to access the requested operational function. If the answer is yes, the processing unit 40 can immediately allow the application to call the requested operational function and to perform it for acquiring needed data or messages to provide service. On the other hand, if the answer is no, the processing unit 40 won't allow the application to access the requested operational function and will generate an error notification to notice the user there's an application tending to access an operational function which isn't accessible.

Especially, to check if the system resources of the electronic device 4 are accessible for the application or to prevent the management table from being not readable due to some accidental damage, before referring to the management table 44 the processing unit 40 can first read the authority access list of the application requesting for accessing the operational function according to the design of the permission management program 43. When the requested operational function is one of the authority items in the authority access list, the processing unit 40 will further read the management table 44 to check if the permission state of the requested operational function for the application is accessible. When the authority access list and the management table 44 of the application both allow the application to access the requested operational function or when the management table 44 isn't readable but the authority access list still allows the requested operational function to be accessed, the processing unit 40 will allow the application to call and perform the requested operational function.

When the application is removed from the electronic device 4, to maintain the unity of the recording, the permission management program 43 can delete recording corresponding to the removed application in the management table 44.

The permission management program 43, the management table 44 and each application installed in the electronic device 4, such as applications 45, 46, can be all stored in a storage unit (not shown in the figures) of the electronic device 4. The storage unit may comprise one or more storage devices or memory chips, such as built-in memory chips or a randomly access memory. To decrease the possibility of damage in the management table 44 or the management table 44 being wrongly accessed, the management table 44 can be stored in an independent storage device and isolated from other programs, or even stored in a remote storage device, and when the processing unit 40 performs the permission management program 43, the management table 44 can be accessed remotely via the Internet 5.

FIG. 1 shows a flow chart of a permission management method for applications according to an embodiment of the instant disclosure;

FIG. 2A and FIG. 2B are schematic views of a management table according to an embodiment of the instant disclosure;

FIG. 3A and FIG. 3B are schematic views of a authority access list according to an embodiment of the instant disclosure;

FIG. 4 shows a block diagram of an electronic device with capability of permission management for applications according to an embodiment of the instant disclosure;

FIG. 5 shows a schematic view of a menu displayed by a user interface according to an embodiment of the instant disclosure;

FIG. 6 shows a schematic view of another menu displayed by a user interface according to an embodiment of the instant disclosure.

In summary, according to the embodiments of this invention, the above permission management method for applications, electronic device thereof, and computer readable medium can collectively control the authority access condition of applications and change the authority access condition of the system resource of one or more installed applications in the electronic device by amending the management table, and this resolves the problem that it can't be rejected when the installed application requests for accessing the system resource or the protected data.

Besides, according to the embodiments of this invention, via above permission management method and the electronic device, the access authority condition of applications can be changed not only by the user but also by an event-trigger that is caused by the cooperation between the applications and the permission management program of the electronic device to automatically change the permission state of one or more operational functions for one or more applications if specific event happened.

More precisely, according to the embodiments of this invention, above permission management method and the electronic device can also prevent the application, during the process of changing authority access condition and accessing operational functions, from acquiring authority access beyond the original authority access area and from expanding the ability of accessing the system resource, and thus decrease the operating risks and the hazard to the security.

Moreover, according to the embodiments of this invention, above permission management method and the electronic device also provide a protecting mechanism to keep the management table complete and safe. The embodiments also provide the electronic device a double-verification mechanism to determine whether or not to allow the application to access specific operational function, which comprises referring to the authority access list of the application and the management table, to assure the legality of accessing specific operational function of the application.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A permission management method for an electronic device capable of installing at least one application program, the electronic device comprising a plurality of accessible operational functions, the method comprising:
   providing a management table and a permission management program for managing the management table;
   reading an authority access list of the application when the application is installed into the electronic device, the authority access list having identification data and at least one authority item, each authority item corresponding to one of the accessible operational functions, the application accessing the operational function corresponding to the authority item while performing the application;
   writing the identification data of the application to the management table according to the authority access list, and labeling the permission state of the operational function corresponding to the authority item in the management table as accessible for the application, labeling the permission states of other operational functions not corresponding to the authority item in the management table as inaccessible for the application;
   after installing the application, performing the permission management program to change the permission state of each operational function accessible for the installed application according to the authority item; and
   referring the records in the management table to determine whether the application is allowed to access a requested operational function of the plurality of accessible operational functions when the application installed in the device is performed and one of the operational functions is requested, such that the electronic device prevents the application from acquiring authority access beyond an original authority access area of the application and from expanding an ability of accessing system resources.

2. The permission management method according to claim 1, wherein the step of referring the records in the management table to determine whether the application is allowed to access the requested operational function comprises:
   accepting the request of the application accessing the operational function when the permission state of the operational function is accessible for the application; and
   denying the request of the application accessing the operational function and providing an error notification when the permission state of the operational function is inaccessible for the application.

3. The permission management method according to claim 1, wherein the step of performing the permission management program comprises:
   receiving an event notification triggered by an event when the electronic device is in operation; and
   changing at least one permission state of the operational function related to the event according to the event notification.

4. The permission management method according to claim 1, wherein the step of performing the permission management program comprises:
   receiving a command for performing the permission management program;
   receiving an instruction for changing the permission state of at least one operational functions recorded in the management table that the application corresponds to; and
   changing the permission state of the operational function according to the instruction;
   wherein, the changed operational function corresponds to one of the authority item in the authority access list.

5. The permission management method according to claim 1, wherein before the step of referring the records in the management table to determine whether the application is allowed to access the requested operational function, comprises:
   checking whether or not the authority access list of the application comprises the authority item same as the requested operational function;
   comparing the authority access list with the management table when the authority access list of the application comprises the authority item same as the requested operational function; and
   rejecting the application to access the requested operational function and generating an error notification when the authority access list of the application doesn't comprise the authority item same as the requested operational function.

6. The permission management method according to claim 1, wherein the step of performing the permission management program to change the permission state in the authority access list comprises:
  changing the permission state of at least one operational functions accessible for the application as inaccessible for the application or changing the permission state of at least one operational functions corresponding to the authority access list and inaccessible for the application as accessible for the application; and
  forbidding labeling the operational function in the management table which is not corresponding to the authority item of the application as accessible for the application.

7. The permission management method according to claim 1, wherein the step of performing the permission management program comprises:
  providing a combination option related to a plurality of the operational functions via a user interface; and
  changing the permission state of each operational function corresponding to the combination option in the authority access list when the combination option is selected.

8. The permission management method according to claim 1, wherein the step of performing the permission management program comprises:
  providing an option of default via an user surface; and
  reading the authority access list of the application and labeling the permission state of the operational function in the management table which is corresponding to the authority item as accessible for the application, and the permission states of other operational functions in the management table which is not corresponding to the authority item as inaccessible for the application when the option of default is selected.

9. An electronic device capable of managing permission of applications, comprising:
  a management table, for recording an identification data of at least one application installed in the electronic device and the permission states of a plurality of operational functions of the electronic device accessed by the application;
  a permission management program, for accessing the management table and changing the permission state of the corresponding operational function of the application in the management table; and
  a processing unit, for performing the permission management program to manage the management table,
  wherein the processing unit reads records in the management table associated with the application and determines whether or not to allow the application to access a requested operational function of the plurality of the operational functions when the application is performed and requests to access one of the operational functions of the electronic device, such that the electronic device prevents the application from acquiring authority access beyond an original authority access area of the application and from expanding an ability of accessing system resources.

10. The electronic device according to claim 9, wherein the processing unit allows the application to access the requested functional operation in the management table when a permission state of the operational function requested by the application is accessible for the application, and rejects the application to access the requested operational function and generates an error notification when the permission state of the requested operational function in the management table is inaccessible for the application.

11. The electronic device according to claim 9, further comprising:
  a user surface;
  wherein the processing unit performs the permission management program to read the management table and displays the management table via the user surface.

12. The electronic device according to claim 11, wherein the permission management program provides and displays a combination option related to some of the plurality of operational functions via the user surface, and the processing unit changes the permission state of each operational function in the management table related to the combination option for the application when the combination option is selected.

13. The electronic device according to claim 11, wherein the permission management program provides an option of default displayed via the user surface, wherein the processing unit reads the authority access list of the application, labeling the permission state of the operational function corresponding to the authority item in the management table as accessible for the application and the permission states of other operational functions not corresponding to the authority item in the management table as inaccessible for the application when the option of default is selected.

14. The electronic device according to claim 9, wherein the processing unit further receives an event notification triggered by an event when the electronic device operates, and changes the permission state of at least one operational function in the management table related to the event according to the event notification.

15. The electronic device according to claim 9, wherein the processing unit receives an instruction for changing permission state of at least one operational functions recorded in the management table that the application corresponds to, and changes the permission state of the operational function according to the instruction, wherein the operational function of which the permission state is changed according to the instruction corresponds to one of the authority items in the authority access list.

16. The electronic device according to claim 9, wherein the authority access list is stored in a storage device in the electronic device, or stored in a server outside the electronic device and accessed via a network unit.

\* \* \* \* \*